(12) United States Patent
Mammei et al.

(10) Patent No.: US 11,720,128 B2
(45) Date of Patent: Aug. 8, 2023

(54) VOLTAGE REGULATOR

(71) Applicant: STMicroelectronics S.r.l., Agrate Brianza (IT)

(72) Inventors: Enrico Mammei, Vittuone (IT); Francesco Ravelli, Villa di Serio (IT); Edoardo Contini, Milan (IT); Paolo Pulici, Lainate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 57 days.

(21) Appl. No.: 17/362,532

(22) Filed: Jun. 29, 2021

(65) Prior Publication Data

US 2022/0413531 A1 Dec. 29, 2022

(51) Int. Cl.
  *G05F 1/565* (2006.01)
  *G11B 5/012* (2006.01)
  *G05F 1/575* (2006.01)

(52) U.S. Cl.
  CPC .............. *G05F 1/565* (2013.01); *G05F 1/575* (2013.01); *G11B 5/012* (2013.01)

(58) Field of Classification Search
  CPC ................................ G05F 1/565; G05F 1/575
  See application file for complete search history.

(56) References Cited

U.S. PATENT DOCUMENTS

| 6,580,261 B1 | 6/2003 | Dow |
| 6,856,124 B2 | 2/2005 | Dearn et al. |
| 7,098,720 B1 | 8/2006 | Dow |
| 7,253,595 B2 | 8/2007 | Oddoart et al. |
| 7,990,219 B2 | 8/2011 | Gleason et al. |
| 8,344,713 B2 | 1/2013 | Shrivas et al. |
| 8,575,905 B2 | 11/2013 | Bulzacchelli et al. |
| 10,056,828 B2 | 8/2018 | Morici |
| 2008/0180080 A1 | 7/2008 | Terry et al. |
| 2015/0188756 A1* | 7/2015 | Amidei ............... H04L 41/0604 709/217 |
| 2015/0301540 A1* | 10/2015 | Shukla ..................... G05F 1/56 327/540 |

(Continued)

OTHER PUBLICATIONS

Chen, Jiann-Jong et al., "A capacitor-free fast-transient-response LDO with dual-loop controlled paths," ResearchGate, IEEE Asian Solid-State Circuits Conference, Nov. 12-14, 2007, 6 pages.

(Continued)

*Primary Examiner* — Kyle J Moody
*Assistant Examiner* — Lakaisha Jackson
(74) *Attorney, Agent, or Firm* — Slater Matsil, LLP

(57) ABSTRACT

In an embodiment, a linear voltage regulator includes: an output transistor having a first current path terminal configured to be coupled to a load, and a second current path terminal coupled to a first supply terminal, where the output transistor is configured to provide, at the first current path terminal, a regulated output voltage; a voltage source circuit configured to provide, in an open loop manner, a first voltage to a control terminal of the output transistor; and a feedback loop coupled between the first current path terminal of the output transistor and the control terminal of the output transistor, the feedback loop including a sense transistor having a first current path terminal coupled to the first current path terminal of the output transistor.

22 Claims, 10 Drawing Sheets

(56) References Cited

U.S. PATENT DOCUMENTS

2016/0028355 A1* 1/2016 Herrera ................ H03F 3/3069
                                                                330/257
2020/0050225 A1* 2/2020 Fiocchi .................. G05F 1/575
2022/0350356 A1* 11/2022 D'Souza ................ G05F 1/565
2022/0382307 A1* 12/2022 Tse ......................... G05F 1/468

OTHER PUBLICATIONS

Deleuran, Alexander N. et al., "A Capacitor-Free, Fast Transient Response Linear Voltage Regulator In a 180nm CMOS," DTU Library, Proceedings of NORCAS 2015, Dec. 28, 2015, 5 pages.

Manda, Mahender et al., "A Multi-Loop Low-Dropout FVF Voltage Regulator with Enhanced Load Regulation," 2017 IEEE 60th International Midwest Symposium on Circuits and Systems (MWSCAS), Oct. 2, 2017, 4 pages.

Milliken, Robert Jon, "A Capacitor-Less Low Drop-Out Voltage Regulator With Fast Transient Response," Texas A&M University, Dec. 2005, 106 pages.

Richtek, "600mA, Ultra-Fast Transient Response Linear Regulator," RT9166B, DS9166B-01, www.richtek.com, Apr. 2011, 9 pages.

Rincón-Mora, Gabriel Alfonso, "Current Efficient, Low Voltage, Low Drop-out Regulators," A Thesis Presented to the Academic Faculty, Georgia Institute of Technology, Nov. 1996, 198 pages.

Texas Instruments, "Technical Review of Low Dropout Voltage Regulator Operation and Performance," Application Report, Mixed Signal Products, SLVA072, Aug. 1999, 30 pages.

Yosef-Hay, Yoni et al., "Fully Integrated, Low Drop-Out Linear Voltage Regulator in 180 nm CMOS," DTU Library, Analog Integrated Circuits and Signal Processing, Jul. 1, 2017, 15 pages.

* cited by examiner

Prior Art

VOLTAGE REGULATOR

TECHNICAL FIELD

The present disclosure relates generally to an electronic system and method, and, in particular embodiments, to a voltage regulator.

BACKGROUND

Voltage regulators may be understood as electrical circuits that are configured to provide a stable DC voltage at the output of the voltage regulator. For example, FIG. 1 shows exemplary voltage regulator 100. As shown in FIG. 1, operational amplifier (op-amp) 104 controls transistor 102 based on reference voltage $V_{ref}$ and feedback voltage $V_{fb}$ to maintain output voltage $V_{out}$ at a target voltage. For example, during normal operation, an error signal $V_{102}$ based on feedback voltage $V_{fb}$ and reference voltage $V_{ref}$ is used to control the gate of transistor 102 to maintain output voltage $V_{out}$ at the target voltage, where the target voltage is based on the reference voltage $V_{ref}$.

During a load transient event (e.g., a sudden change in load current $I_{load}$), output voltage $V_{out}$ may temporarily overshoot or undershoot with respect to the target voltage. For example, when the load current $I_{load}$ suddenly increases, output voltage $V_{out}$ may suddenly decrease, which may cause feedback voltage $V_{fb}$ to also decrease. Op-amp 104 may cause an increase in voltage $V_{102}$ and thus cause output voltage $V_{out}$ to recover to the target voltage. Since the response time of op-amp 104 may be slower than the period of time in which the sudden drop in output voltage $V_{out}$ occurs, a voltage undershoot of, e.g., several mV may occur. The duration and magnitude of the output voltage drop may be related to the response time of the feedback loop, which includes feedback network 106, op-amp 104, and transistor 102.

SUMMARY

In accordance with an embodiment, a linear voltage regulator includes: an output transistor having a first current path terminal configured to be coupled to a load, and a second current path terminal coupled to a first supply terminal, where the output transistor is configured to provide, at the first current path terminal, a regulated output voltage; a voltage source circuit configured to provide, in an open loop manner, a first voltage to a control terminal of the output transistor; and a feedback loop coupled between the first current path terminal of the output transistor and the control terminal of the output transistor, the feedback loop including a sense transistor having a first current path terminal coupled to the first current path terminal of the output transistor.

In accordance with an embodiment, a linear voltage regulator includes: an output transistor having a first current path terminal configured to be coupled to a load, and a second current path terminal coupled to a first supply terminal; a sense transistor having a first current path terminal coupled to the first current path terminal of the output transistor; a current mirror coupled between a second current path terminal of the sense transistor and a control terminal of the output transistor; a filtering capacitor coupled between the control terminal of the output transistor and a second supply terminal; a first transistor having a first current path terminal coupled to the second supply terminal, and a second current path terminal coupled to the control terminal of the output transistor; a second transistor having a first current path terminal coupled to the control terminal of the output transistor, and a second current path terminal coupled to a third supply terminal; a third transistor having a first current path terminal coupled to the control terminal of the sense transistor, a second current path terminal coupled to the second supply terminal, and a control terminal coupled to a control terminal of the second transistor and to the second current path terminal of the third transistor; and a fourth transistor having a first current path terminal coupled to the control terminal of the sense transistor, a second current path terminal coupled to the third supply terminal, and a control terminal coupled to a control terminal of the second transistor.

In accordance with an embodiment, a method includes: supplying, in an open loop manner, a first voltage to a control terminal of an output transistor, the output transistor having a first current path terminal coupled to a load; supplying, with the output transistor, a regulated output voltage to the load; supplying, in an open loop manner, a second voltage to a control terminal of a sense transistor, the sense transistor having a first current path terminal coupled to the load; supplying, with the output transistor and the sense transistor, a load current to the load; and applying a feedback current to the control terminal of the output transistor, the feedback current being based on a sense current flowing through the sense transistor.

In accordance with an embodiment, a hard-disk drive (HDD) writer circuit includes: a positive supply terminal configured to receive a positive supply voltage; a negative supply terminal configured to receive a negative supply voltage; an output stage configured to be coupled to a magnetic head; first and second logic chains coupled to high-side current sources of the output stage; third and fourth logic chains coupled to low-side current sources of the output stage; a first linear voltage regulator configured to provide a first regulated voltage that is lower than the positive supply voltage; and a second linear voltage regulator configured to provide a second regulated voltage that is higher than the negative supply voltage, where the first and second logic chains are configured to be powered by the positive supply voltage and the first regulated voltage, where the third and fourth logic chains are configured to be powered by the negative supply voltage and the second regulated voltage, and where first linear voltage regulator includes: an output transistor having a first current path terminal coupled to the first and second logic chains, and a second current path terminal coupled to the negative supply terminal, where the output transistor of the first linear voltage regulator is configured to provide, at the first current path terminal of the output transistor of the first linear voltage regulator, the first regulated voltage, a voltage source circuit configured to provide, in an open loop manner, a first voltage to a control terminal of the output transistor of the first linear voltage regulator, and a feedback loop coupled between the first current path terminal of the output transistor of the first linear voltage regulator and the control terminal of the output transistor of the first linear voltage regulator, the feedback loop including a sense transistor having a first current path terminal coupled to the first current path terminal of the output transistor of the first linear voltage regulator, and where second linear voltage regulator includes: an output transistor having a first current path terminal coupled to the third and fourth logic chains, and a second current path terminal coupled to the positive supply terminal, where the output transistor of the second linear voltage regulator is configured to provide, at the first current path terminal of the output transistor of the second linear voltage regulator, the second regulated voltage, a voltage source circuit configured to provide, in an open loop manner, a second voltage to a control terminal of the output transistor of the second linear voltage regulator, and a feedback loop coupled between the first current path terminal of the output transistor of the second linear voltage regulator and the control terminal of the output transistor of the second linear voltage regulator, the feedback loop including a sense transistor having a first current path terminal coupled to the first current path terminal of the output transistor of the second linear voltage regulator.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a voltage regulator using bipolar transistors with fast transient response, e.g., for hard disk drive (HDD) applications. Some embodiments may be implemented with other types of transistors, such as metal-oxide semiconductor field-effect transistors (MOSFETs). Some embodiments may be used in other types of applications, such as power management units (PMU) on portable devices, and low power high-frequency CMOS circuits, as well as in other application that may benefit from a stable regulated voltage.

In an embodiment of the present invention, a linear voltage regulator has an open loop architecture for providing a target output voltage and a fast feedback loop for compensating for changes in output current. In some embodiments, by using an open loop architecture together with a fast feedback loop, some embodiments are advantageously capable of providing a more stable output voltage and a faster turn on time, when compared to linear voltage regulators that use a fast feedback loop together with a slow feedback loop.

Figure 1:
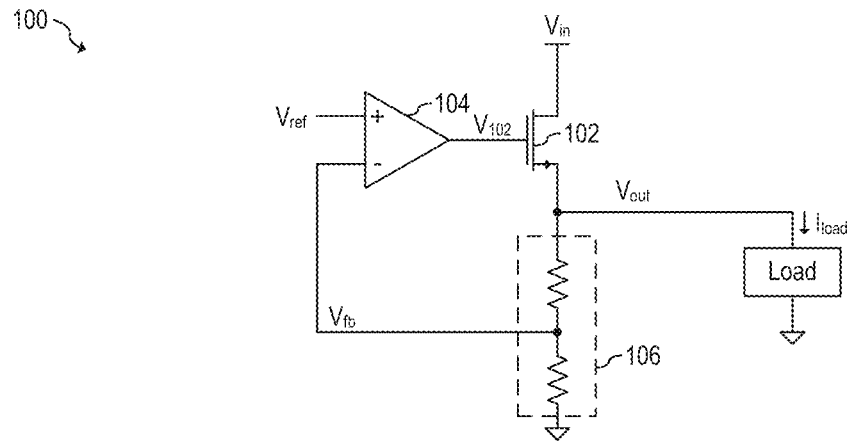
FIG. 1 shows an exemplary voltage regulator.
Figure 2A:
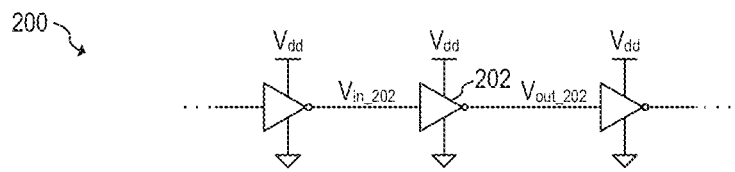
FIGS. 2A and 2B show an exemplary inverter chain, and associated waveforms, respectively.
Figure 2B:
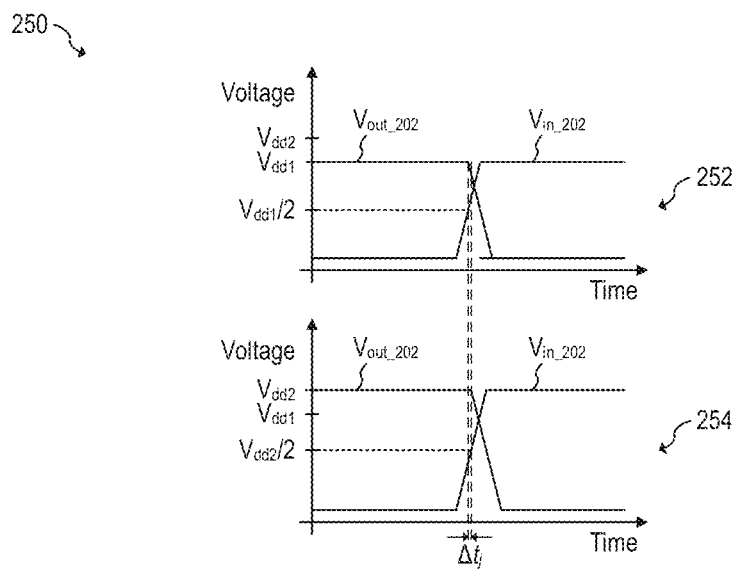

Timing jitter (also referred to jitter) may be understood as a deviation from expected switching times of a signal. For example, FIGS. 2A and 2B show exemplary inverter chain 200, and associated waveforms 250, respectively, at different supply voltages. As illustrated by plots 252 and 254, the threshold voltage at which inverter 202 changes state is based on the value of supply voltage $V_{dd}$. As shown in FIG. 2B, when supply voltage $V_{dd}$ has a lower voltage ($V_{dd_1}$), the threshold value of inverter 202 is lower than when supply voltage $V_{dd}$ has a higher voltage ($V_{dd_2}$). The shift in threshold voltage of inverter 202 causes a corresponding shift in the transition time, as illustrated by $\Delta t_j$.

As can be seen from FIGS. 2A and 2B, variations in supply voltage $V_{dd}$ may cause corresponding timing variations (jitter). Some applications are sensitive to jitter. For example, in some hard disk drive (HDD) applications, a writer circuit provides a high-speed current signal to a magnetic head. The magnetic head generates a magnetic field for storing bits on a disk. The jitter of the high-speed current may be related to the system bit error rate of the HDD.

In an embodiment of the present invention, the bit error rate of an HDD is reduced by reducing the jitter in the high-speed current signal provided by the writer circuit. The jitter is reduced by providing a stable voltage to the writer circuit with one or more linear voltage regulators operating in open loop and having a fast closed-loop for fast transient response.

Figure 3:
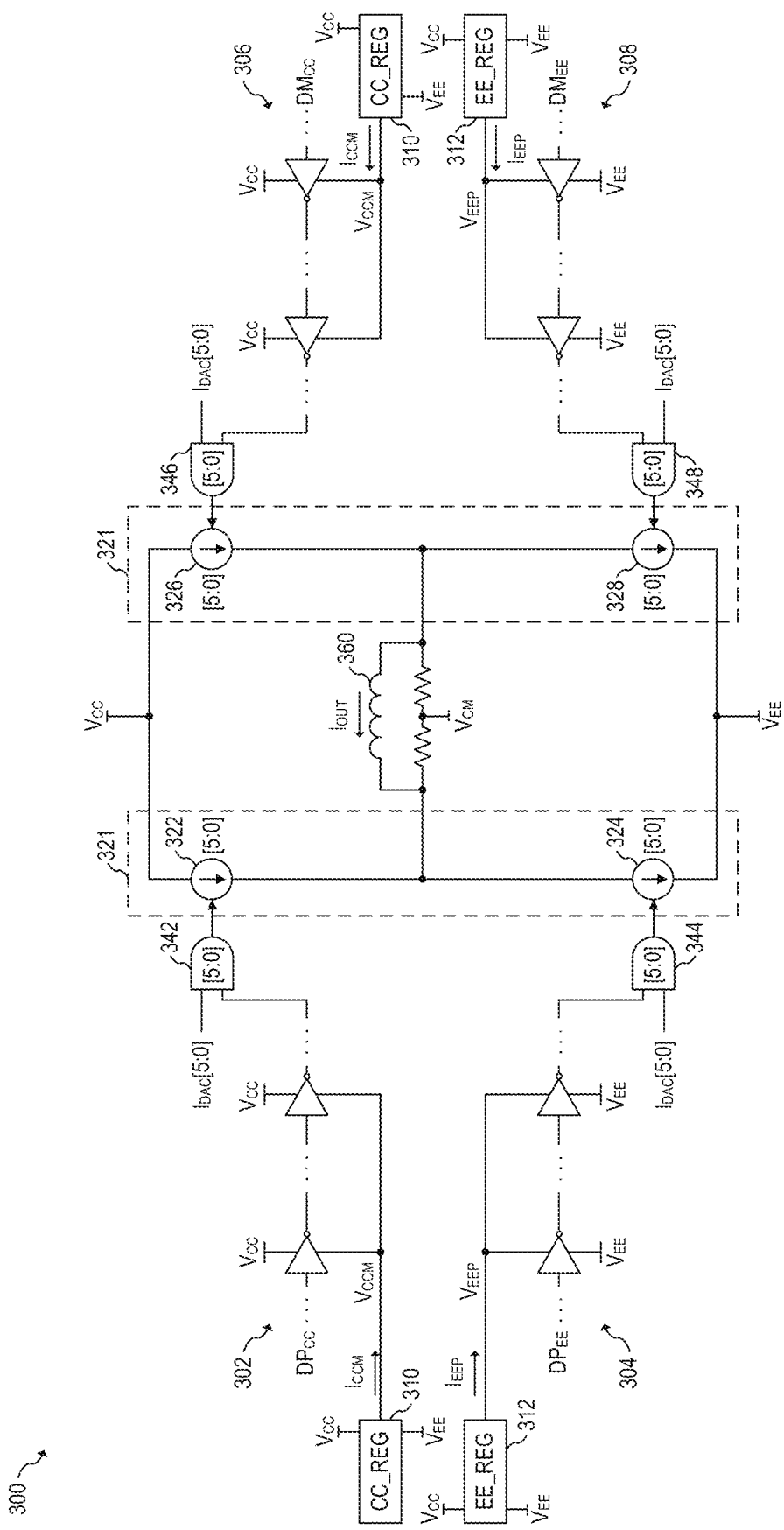
FIG. 3 shows a schematic diagram of a writer circuit for an HDD, according to an embodiment of the present invention.

FIG. 3 shows a schematic diagram of writer circuit 300 for an HDD, according to an embodiment of the present invention. Writer circuit 300 includes a digital-to-analog converter (DAC) that receives differential data ($DP_{CC}$, $DM_{CC}$ and $DP_{EE}$, $DM_{EE}$) via logic chains (302, 304, 306, 308) and provides output current $I_{out}$ based on the received differential data and with a magnitude based on a DAC code ($I_{DAC}$). The output current $I_{out}$ is provided through output stage 321 to load 360 (e.g., a magnetic head for writing a disk). In some embodiments, the data transfer speed may be 4 Gbps. Other data transfer speeds, such as lower data transfer speeds or higher data transfer speeds, are also possible.

As shown in FIG. 3, linear voltage regulator 310 provides supply voltage $V_{CCM}$ to logic gates of logic chains 302 and 306 and voltage regulator 312 provides supply voltage $V_{EEP}$ to logic gates of logic chains 304 and 308.

Logic chains 302, 304, 306, and 308 include a plurality of (e.g., CMOS) logic gates (e.g., AND gate(s), OR gate(s), NAND gate(s), NOR gate(s), XOR gate(s), XNOR gate(s), inverter(s), and/or buffer(s)) connected in a chain. In some embodiments, as the logic chains (302, 304, 306, 308) switch, linear voltage regulators 310, 312, may each provide over 100 mA of current or more (e.g., 150 mA or more) to the logic gates of the logic chains (302, 304, 306, 308). In some embodiments, the logic gates switch at 4 Gbps.

As illustrated in FIG. 3, DAC code $I_{DAC}$ includes 6 bits. Thus, in the embodiment illustrated in FIG. 3, there are 6 AND gates 342 driving 6 respective current sources 322, 6 AND gates 344 driving 6 respective current sources 324, 6 AND gates 346 driving 6 respective current sources 326, and 6 AND gates 348 driving 6 respective current sources 328. In some embodiments, DAC code $I_{DAC}$ may include more than 6 bits, such as 7 bits, 8 bits, or more, or less than 6 bits, such as 5 bits, or less.

In some embodiments, voltage $V_{CC}$ may be 5 V. Higher voltages, such as 5.5 V, 6 V, or higher, or lower voltages, such as 4.5 V, or lower, may also be used.

In some embodiments, voltage $V_{CCM}$ may be 1 V lower than voltage $V_{CC}$. Higher voltages, such as 0.9 V lower than $V_{CC}$ or higher, or lower voltages, such as 1.1 V, 1.8 V, or 2.5 V lower than $V_{CC}$, or lower, may also be used.

In some embodiments, voltage $V_{EEP}$ may be 1 V higher than voltage $V_{EE}$. Higher voltages, such as 1.1 V, 1.8 V, or 2.5 V higher than $V_{EE}$ or higher, or lower voltages, such as 0.9 V higher than $V_{EE}$, or lower, may also be used.

As a non-limiting example, in some embodiments, $V_{CC}$ is 5 V, $V_{CCM}$ is 4 V, $V_{EE}$ is −3 V, and $V_{EEP}$ is −2 V. Other voltages are also possible.

Figure 4:
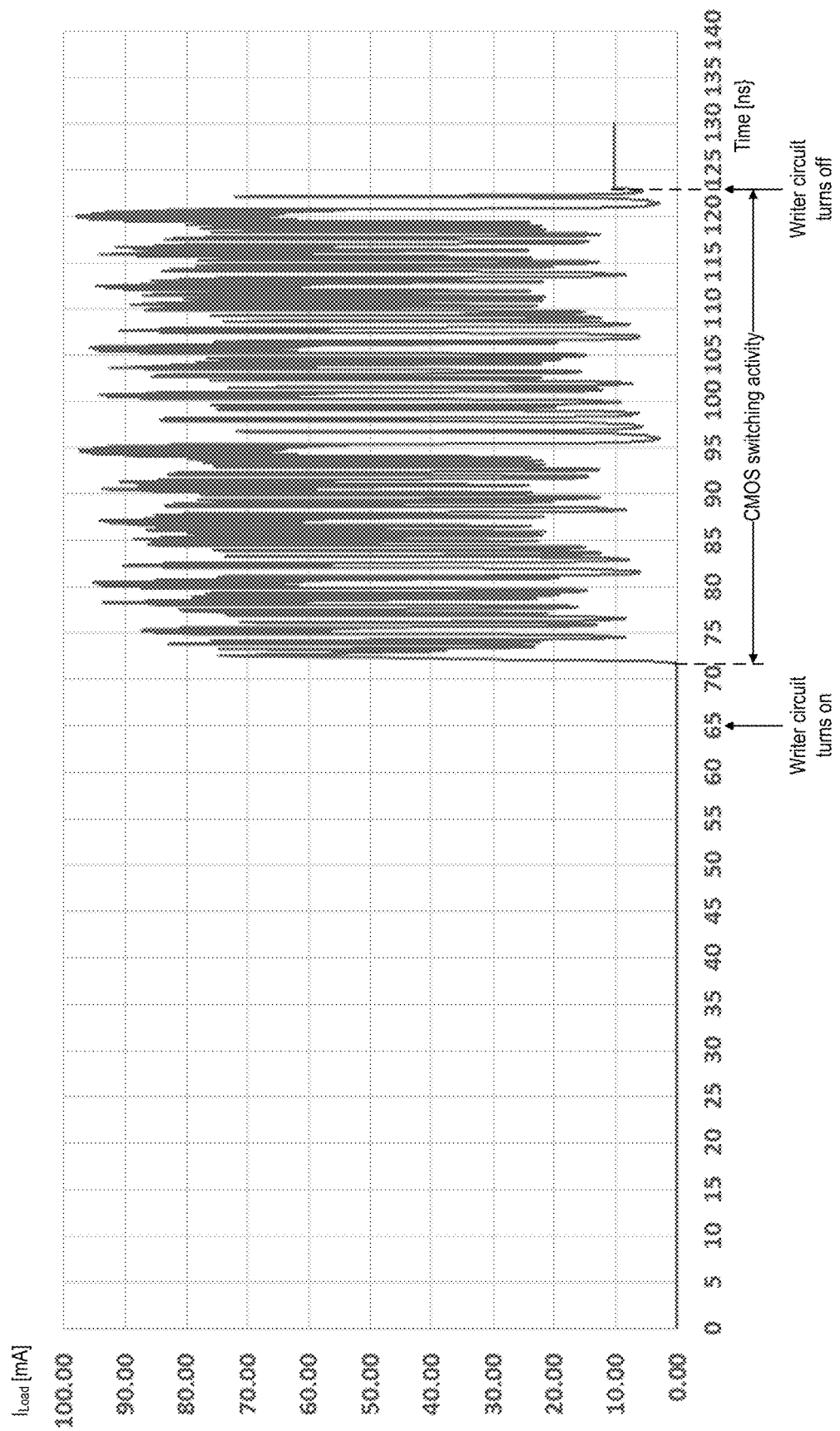
FIG. 4 shows an output current of a linear voltage regulator, according to an embodiment of the present invention.

FIG. 4 shows an output current of linear voltage regulator 312, according to an embodiment of the present invention. Linear voltage regulator 310 may exhibit an output current with an absolute value similar to the output current shown in FIG. 4.

As shown in FIG. 4, shortly after writer circuit 300 is activated (e.g., less than 25 ns after writer circuit 300 is activated), the current provided by linear voltage regulator 312 exhibits a relatively large and continuous output current fluctuation with a variation of about 90 mA for a period of time of, e.g., 50 ns. The period of time during which the writer circuit is active may vary, and may be longer than 50 ns, such as 60 ns, 100 ns, or longer, or shorter than 50 ns, such as 40 ns, or shorter. In some embodiments, the current fluctuation exhibited by the output current of linear voltage regulator 312 may be bigger (e.g., 100 mA, 150 mA, or more), or smaller (e.g., 80 mA, or less).

In some embodiments, a linear voltage regulator advantageously achieves fast turn on time (e.g., from 0 V to the target output voltage in less than 25 ns) by using an open loop architecture to provide the output voltage. In some embodiments, the linear voltage regulator advantageously achieves low output voltage ripple, even in the presence of relatively large output current fluctuations, by using a fast feedback loop.

Figure 5:
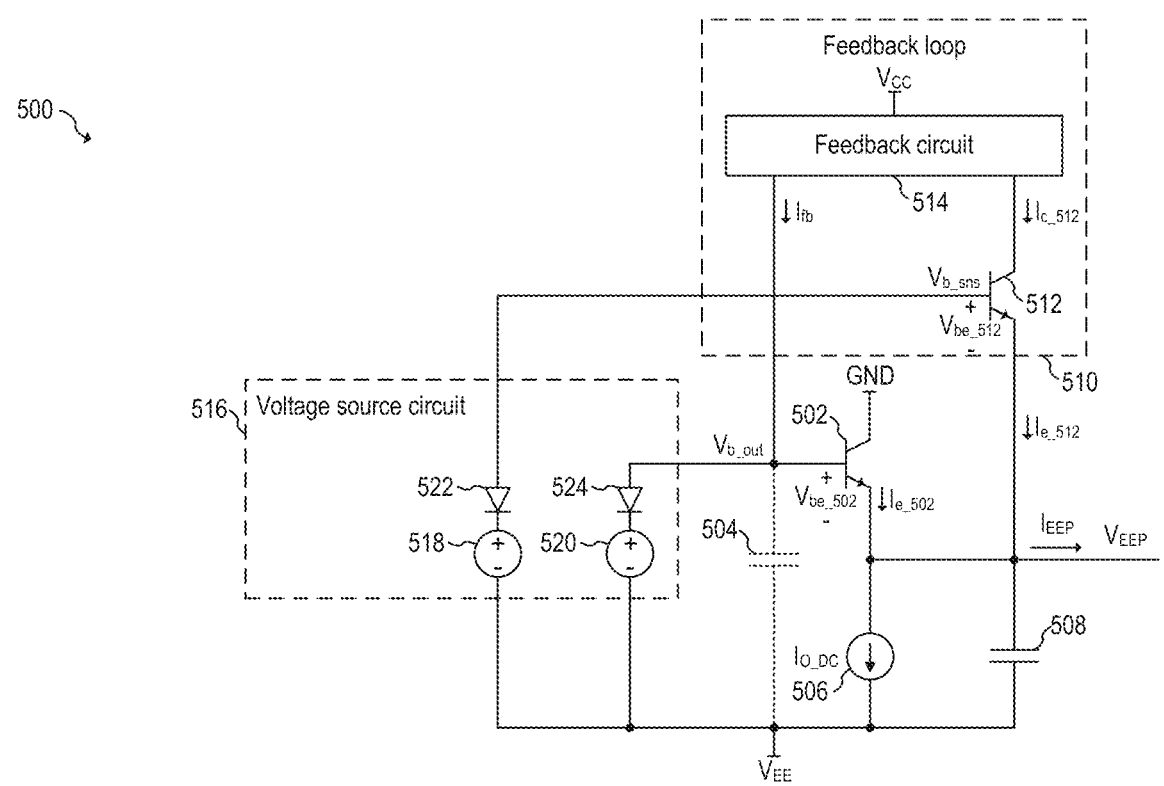
FIGS. 5-7 show linear voltage regulators, according to embodiments of the present invention.

FIG. 5 shows linear voltage regulator 500, according to an embodiment of the present invention. Linear voltage regulator 500 comprises an output transistor 502, voltage source circuit 516, feedback loop 510, output capacitor 508, and current source 506. In some embodiments, voltage source circuit 516 includes voltage sources 518 and 520 and diodes 522 and 524. Feedback loop 510 includes sense transistor 512, and feedback circuit 514. Linear voltage regulator 312 may be implemented as linear voltage regulator 500.

During normal operation, voltage source 520 provides, in an open loop manner, a first reference voltage ($V_{b\_out}$) to the base of output transistor 502. Output transistor 502 is implemented in a voltage follower configuration with biasing current $I_{O\_DC}$. Thus, in some embodiments, during steady state, voltage $V_{EEP}$ may be given by $$V_{EEP} = V_{b\_out} - V_{be\_502} \qquad (1)$$

where voltage $V_{be\_502}$ represents the base-to-emitter voltage of output transistor 502. In some embodiments, $V_{EEP}$ may be between 0.9 V and 1.2 V higher than voltage $V_{EE}$. Other voltages, such as lower than 0.9 V, or higher than 1.2 V, may also be used.

As shown in FIG. 5, voltage source 518 provides, in an open loop manner, a second reference voltage ($V_{b\_sns}$) to the base of sense transistor 512. As shown, sense transistor 512 is implemented in a voltage follower configuration. During steady state and with current $I_{EEP}$ equal to 0 mA, the first reference voltage ($V_{b\_out}$) may be equal to the second reference voltage ($V_{b\_sns}$). During steady state and with current $I_{EEP}$ higher than 0 mA, the first reference voltage ($V_{b\_out}$) may be higher than the second reference voltage ($V_{b\_sns}$).

As can be seen in FIG. 5, in some embodiments, current $I_{EEP}$ is provided in parallel by output transistor 502 and by sense transistor 512. In some embodiments, output transistor 502 may be configured to carry more current than sense transistor 512. For example, in some embodiments, output transistor 502 has M times the current capability than sense transistor 512, where M may be, e.g., between 10 and 50. In some embodiments, M may be lower than 10 or higher than 50.

During a load transient event in which current $I_{EEP}$ suddenly increases, the emitter current $I_{e\_502}$ of output transistor 502 suddenly increases, causing an increase in the base-emitter voltage $V_{be\_502}$ of output transistor 502. For example, in some embodiments, when current $I_{EEP}$ suddenly changes from 0 to $I_{MAX}$, the change in base-emitter voltage $\Delta V_{be\_502}$ may be given by $$\Delta V_{be\_502} \approx V_t \ln \frac{I_{MAX}}{I_{O\_DC}} \qquad (2)$$

where $V_t$ represents the thermal voltage of a PN junction, and current $I_{O\_DC}$ is the current generated by current source 506. In some embodiments, $I_{MAX}$ may be between 80 mA and 150 mA. In some embodiments, current $I_{O\_DC}$ may be, e.g., between 1 mA and 5 mA. In some embodiments, current $I_{MAX}$ may be higher than 150 mA or lower than 80 mA. In some embodiments, current $I_{O\_DC}$ may be higher than 5 mA or lower than 1 mA.

When current $I_{EEP}$ suddenly increases, the emitter current $I_{e\_512}$ of sense transistor 512 also increases, thereby causing an increase in collector current $I_{c\_512}$. Feedback circuit 514 generates feedback current $I_{fb}$ based on current $I_{c\_512}$, and, thus, also increases as a result of the increase in current $I_{EEP}$. Feedback current $I_{fb}$ pulls up voltage $V_{b\_out}$ to compensate for the increase in base-emitter voltage $V_{be\_502}$ to recover from the load transient event and maintain voltage $V_{EEP}$ constant.

A similar behavior may be observed for a load transient event in which current $I_{EEP}$ suddenly decreases. For example, in some embodiments, during a load transient event in which current $I_{EEP}$ changes by $\Delta I_{EEP}$, voltage $V_{EEP}$ may be given by $$V_{EEP}=V_{b\_out}-V_{be\_502}+\Delta V_{be\_502}-\Delta V_{b\_out} \quad (3)$$

where $\Delta V_{be\_502}$ represents the change in base-emitter voltage of transistor 502 in response to the change in current $\Delta I_{EEP}$, and $\Delta V_{b\_out}$ represents the change in base voltage of the base of output transistor 502 caused by feedback loop 510 in response to the change in current $\Delta I_{EEP}$, where $\Delta I_{EEP}$ may be positive or negative.

In some embodiments, providing the output voltage (e.g., $V_{EEP}$) of the linear voltage regulator (e.g., 500) using an open loop architected (e.g., providing, in an open loop manner, voltages $V_{b\_out}$ and $V_{b\_sns}$ to transistors 502 and 512, respectively) in cooperation with a fast feedback loop (e.g., 510), advantageously allows for compensating for changes in the output voltage (e.g., $V_{EEP}$) of the linear voltage regulator (e.g., 500) due to load transient events (e.g., $\Delta I_{EEP}$) while maintaining a fast turn-on time of the linear voltage regulator (e.g., 500).

In some embodiments, the regulation loop illustrated by Equation 3 may be maintained depending on the bandwidth of the feedback loop 510. In some embodiments, feedback loop 510 may have bandwidth of 0.5 GHz. Higher bandwidth, such as 1 GHz, or higher, or lower bandwidth, such as 0.25 GHz, or lower, may also be used.

In some embodiments, load transient events faster than the bandwidth of feedback loop 510 are compensated by using filtering capacitor 504. By using a filtering capacitor (e.g., 504) coupled to the base the output transistor (502), some embodiments advantageously allow for compensating for load transient events that are faster than the bandwidth of feedback loop 510 while using a capacitor of relatively small size (e.g., when compared to obtaining a similar affect with a capacitor connected to the emitter of transistor 502).

Figure 6:
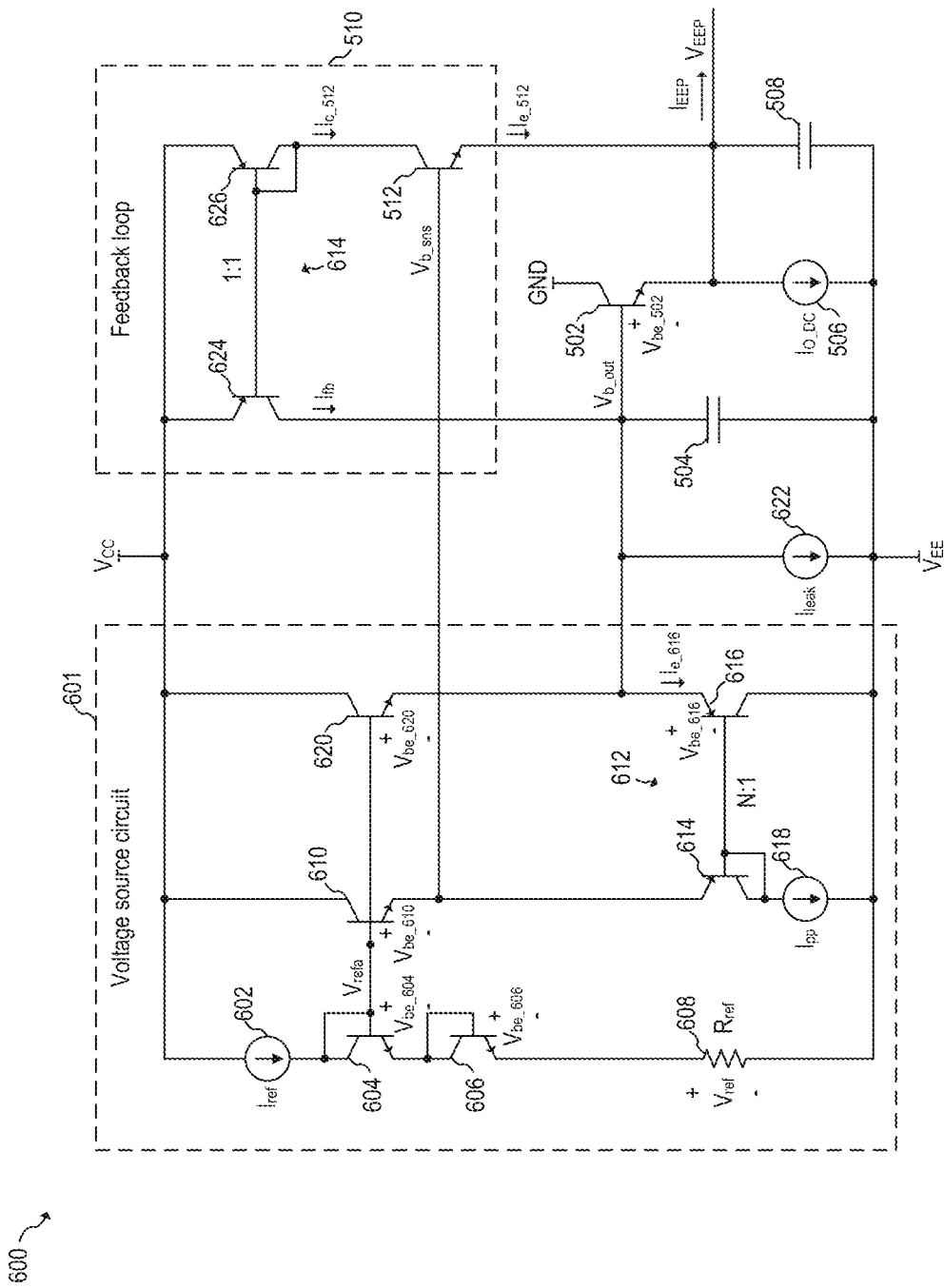

FIG. 6 shows linear voltage regulator 600, according to an embodiment of the present invention. Linear voltage regulator 500 may be implemented as linear voltage regulator 600. As shown, in FIG. 6, transistors 604 and 606 are diode-connected, and transistors 610 and 620 are implemented in a voltage-follower configuration.

During normal operation, reference current $I_{ref}$ flows through reference resistor 608, thereby generating reference voltage $V_{ref}$ across reference resistor 608. Thus, in some embodiments, during steady state, the voltages $V_{b\_out}$ and $V_{b\_sns}$ provided by voltage source circuit 601 may be given by $$V_{b\_out}=V_{ref}+V_{be\_606}+V_{be\_604}-V_{be\_620} \quad (4)$$

and $$V_{b\_sns}=V_{ref}+V_{be\_606}+V_{be\_604}-V_{be\_610} \quad (5)$$

where voltage $V_{be\_606}$ represents the base-to-emitter voltage of transistor 606, voltage $V_{be\_604}$ represents the base-to-emitter voltage of transistor 604, voltage $V_{be\_620}$ represents the base-to-emitter voltage of transistor 620, and voltage $V_{be\_610}$ represents the base-to-emitter voltage of transistor 610.

In some embodiments, transistors 620 and 610 match so that voltages $V_{be\_610}$ and $V_{be\_620}$ are equal so that voltages $V_{b\_out}$ and $V_{b\_sns}$ are equal.

As can be seen in FIG. 6, in some embodiments, voltage $V_{EEP}$ may be given by $$V_{EEP}=V_{ref}+V_{be\_606}+V_{be\_604}-V_{be\_620}-V_{be\,\text{\textcircled{5}}} \quad (6).$$

In some embodiments, the sum of voltages $V_{be\_606}$ and $V_{be\_604}$ is equal to the sum of voltages $V_{be\_620}$ and $V_{be\_502}$. Thus, in some embodiments, in steady state, voltage $V_{EEP}$ is equal to reference voltage $V_{ref}$.

During a load transient event, a portion of the change in feedback current $\Delta I_{fb}$ flows through the emitter of transistors 616, thereby causing change $\Delta V_{be\_616}$ in the base-emitter voltage $V_{be\_616}$ of transistor 616. In some embodiments, the change in base-emitter voltage $\Delta V_{be\_616}$ of transistor 616 caused by the change in feedback current $\Delta I_{fb}$ caused by the change in load transient current $\Delta I_{EEP}$ is advantageously equal to the change $\Delta V_{be\_502}$ caused by the change in load transient current $\Delta I_{EEP}$ thereby advantageously keeping voltage $V_{EEP}$ constant during a load transient event ($\Delta I_{EEP}$). For example, in some embodiments in which output transistor 502 has M times the current capability than sense transistor 512, during a load transient event in which current $I_{EEP}$ changes from 0 to $I_{MAX}$, the emitter current $I_{e\_512}$ of transistor 512 may be given by $$I_{e\_512} = \frac{I_{MAX} + I_{O\_DC}}{M+1} \quad (7)$$

the change in base-emitter voltage $\Delta V_{be\_502}$ of transistor 502 may be given by $$\Delta V_{be\_502} = V_t \ln \frac{I_{MAX} + I_{O\_DC}}{I_{O\_DC}} \quad (8)$$

and the change in base-emitter voltage $\Delta V_{be\_616}$ of transistor 616 may be given by $$\Delta V_{be\_616} = V_t \ln \frac{\frac{1}{M+1}I_{MAX} + I_{e\_616}}{I_{e\_616}} \quad (9)$$

In some embodiments, current $I_{e\_616}$ may given by $$I_{e\_616} = \frac{I_{O\_DC}}{M+1} \quad (10)$$

Replacing Equation 10 into Equation 9, and comparing it to Equation 8, it can be seen that $$\Delta V_{be\_616}=\Delta V_{be\_502} \quad (11).$$

In some embodiments, current mirrors 614 and 616 have a ratio of 1:1 and N:1, respectively, where N is a positive integer, e.g., between 1 and 50, such as 10. Other ratios are also possible. In some embodiments, current mirror 614 may have a ratio different than 1:1. For example, in some embodiments, transistors 624 and 626 may have a ratio of F:1, where F is a positive integer, e.g., between 1 and 50, such as 10. Other ratios, such as ratios in which F is lower than 1, are also possible.

In some embodiments, the collector of output transistor 502 may be coupled to a different supply voltage (e.g., $V_{CC}$) instead of ground (GND).

Figure 7:
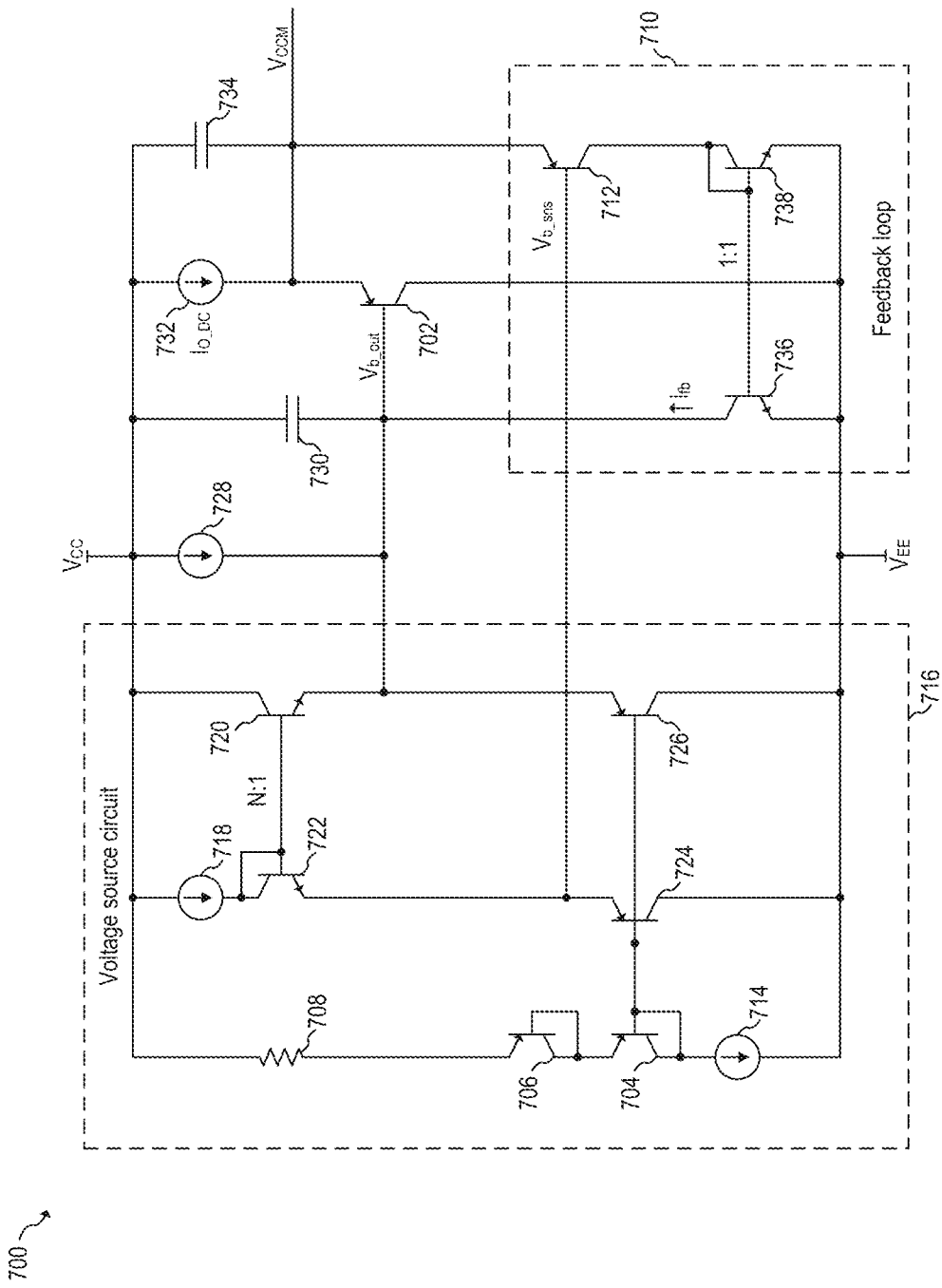

Linear voltage regulator 500 or 600 may be modified to supply a negative voltage (e.g., $V_{CCM}$) with respect to a power supply voltage (e.g., $V_{CC}$). For example, FIG. 7 shows linear voltage regulator 700, according to an embodiment of the present invention. Linear voltage regulator 310 may be implemented as linear voltage 700.

Linear voltage regulator 700 operates in a similar manner as linear voltage regulator 600. Linear voltage regulator 700, however, provides a negative voltage ($V_{CCM}$) with respect to a power supply voltage ($V_{CC}$) instead of providing a positive voltage ($V_{EEP}$) with respect to a power supply voltage ($V_{EE}$).

FIGS. 8A and 8B show simulation waveforms, and zoomed-in simulation waveforms, respectively, of linear voltage regulator 600, according to an embodiment of the present invention. FIGS. 8A and 8B illustrate a comparison between the performance of voltage $V_{EEP}$, as generated by linear voltage regulator 600, and of voltage $V_{EEP}$, as generated by providing the open loop voltage $V_{b\_out}$ from voltage source circuit 601 to output transistor 502, and without implementing feedback loop 510. Curve 802 shows voltage $V_{EEP}$, as generated by linear voltage regulator 600. Curve 804 shows voltage $V_{EEP}$, as generated by providing the open loop voltage $V_{b\_out}$ from voltage source circuit 601 to output transistor 502, and without implementing feedback loop 510.

Figure 8:
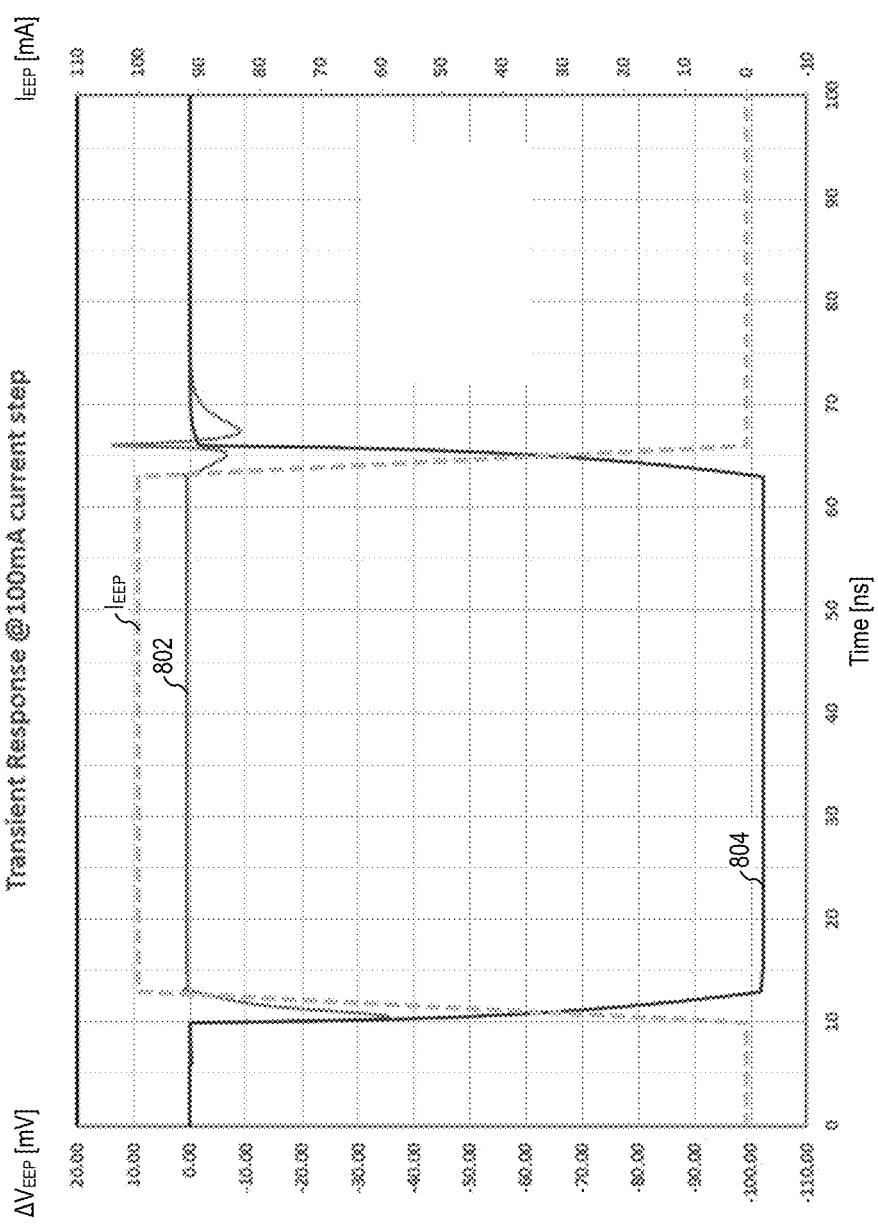
FIGS. 8A and 8B show simulation waveforms, and zoomed-in simulation waveforms, respectively, of the linear voltage regulator of FIG. 6, according to an embodiment of the present invention.

As shown in FIG. 8, when $I_{EEP}$ is 0 mA, the voltage $V_{EEP}$ is at the nominal voltage for both curves 802 and 804. When current $I_{EEP}$ increases from 0 mA to 100 mA, the open-loop solution without feedback loop (as shown by curve 804) drops more than 100 mV, while linear voltage regulator 600 recovers within 3.5 ns, only exhibiting a voltage drop $\Delta V_{EEP}$ of about 35 mV.

Figure 9:
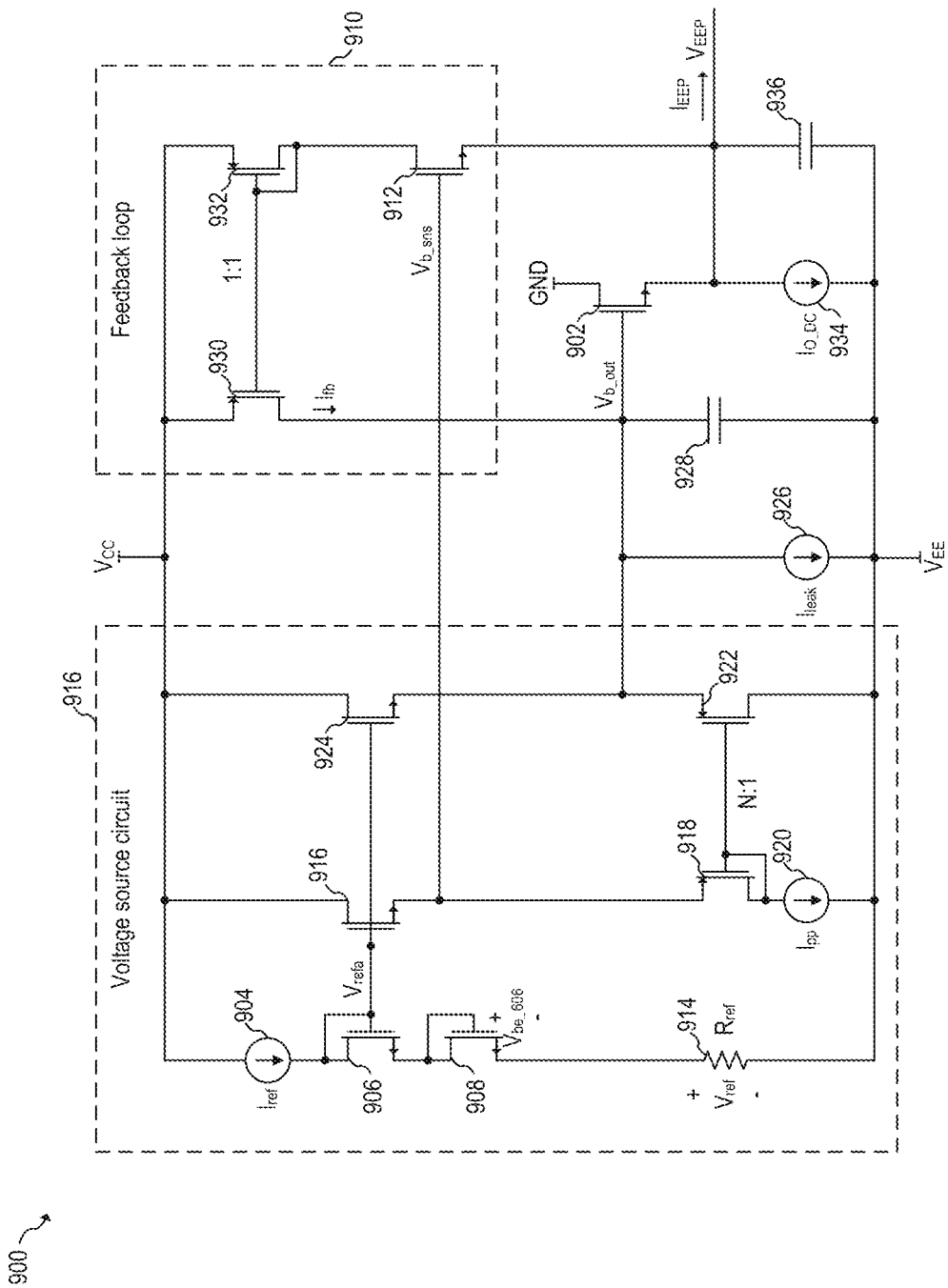
FIGS. 9-11 show linear voltage regulators, according to embodiments of the present invention.

Some embodiments may be implemented with transistors other than bipolar transistors such as with MOS transistors. For example, FIG. 9 shows linear voltage regulator 900, according to an embodiment of the present invention. Linear voltage regulator 312 may be implemented as linear voltage regulator 900. Linear voltage regulator 900 operates in a similar manner as linear voltage regulator 600. Linear voltage regulator 900, however, is implemented with MOS transistors instead of bipolar transistors. Linear voltage regulator 700 may be modified in a similar manner.

Other implementations are also possible. For example, in some embodiments, a mix between MOS transistors and bipolar transistors may be used to implement a linear voltage regulator (e.g., 500, 600, 700, 900). For example, in some embodiments, transistors 502, 512, 606, 616 and 614 are of one type (e.g., bipolar) and transistors 626, 624, 604, 610 and 620 are of another type (e.g., MOS). Other implementations are also possible.

Figure 10:
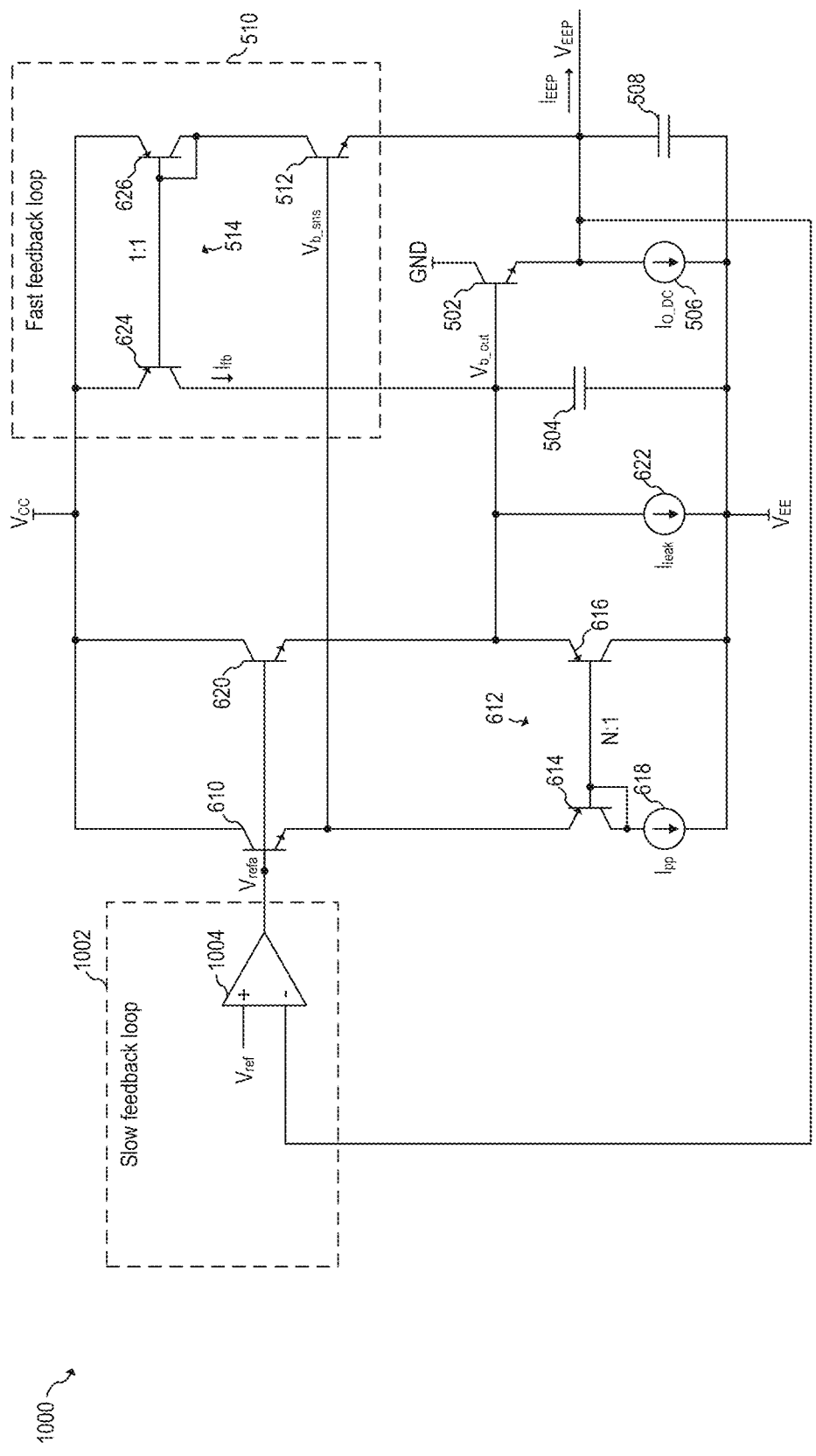

Some embodiments may be implemented with an additional slow feedback loop. For example, FIGS. 10 shows linear voltage regulator 1000, according to an embodiment of the present invention. Linear voltage regulator 312 may be implemented as linear voltage regulator 1000. Linear voltage regulator 1000 operates in a similar manner as linear voltage regulator 600. Linear voltage regulator 1000, however, includes feedback loop 1002.

During normal operation, operational amplifier 1004 generates voltage $V_{refa}$ so as to cause voltage $V_{EEP}$ to be equal to voltage $V_{ref}$.

Figure 11:
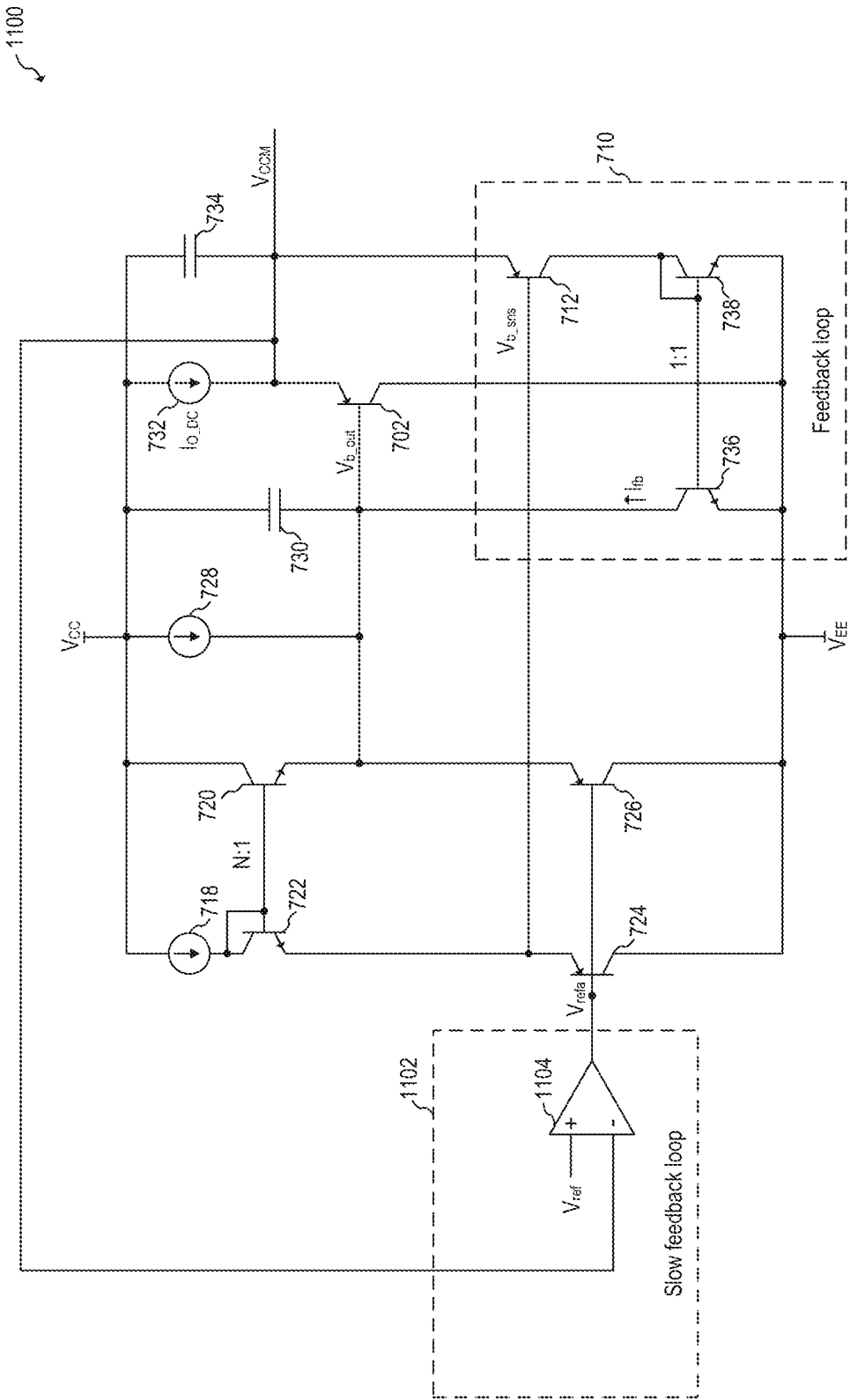

Linear voltage regulators 700, and 900 may be modified in a similar manner. For example, FIG. 11 shows linear voltage regulator 1100, according to an embodiment of the present invention. Linear voltage regulator 310 may be implemented as linear voltage regulator 1100. Linear voltage regulator 1000 operates in a similar manner as linear voltage regulator 700. Linear voltage regulator 1000, however, includes feedback loop 1102.

During normal operation, operational amplifier 1104 generates voltage $V_{refa}$ so as to cause voltage $V_{CCM}$ to be equal to voltage $V_{ref}$.

By using a slow feedback loop for regulating the output voltage (e.g., $V_{EEP}$ or $V_{CCM}$), some embodiments advantageously achieve greater target voltage accuracy when compared to embodiments that do not use the slow feedback loop.

Example embodiments of the present invention are summarized here. Other embodiments can also be understood from the entirety of the specification and the claims filed herein.

Example 1. A linear voltage regulator including: an output transistor having a first current path terminal configured to be coupled to a load, and a second current path terminal coupled to a first supply terminal, where the output transistor is configured to provide, at the first current path terminal, a regulated output voltage; a voltage source circuit configured to provide, in an open loop manner, a first voltage to a control terminal of the output transistor; and a feedback loop coupled between the first current path terminal of the output transistor and the control terminal of the output transistor, the feedback loop including a sense transistor having a first current path terminal coupled to the first current path terminal of the output transistor.

Example 2. The linear voltage regulator of example 1, further including a filtering capacitor coupled between the control terminal of the output transistor and a second supply terminal.

Example 3. The linear voltage regulator of one of examples 1 or 2, where the voltage source circuit is configured to provide, in an open loop manner, a second voltage to a control terminal of the sense transistor.

Example 4. The linear voltage regulator of one of examples 1 to 3, where the voltage source circuit includes: a first transistor having a first current path terminal coupled to a second supply terminal, and a second current path terminal coupled to the control terminal of the output transistor; a second transistor having a first current path terminal coupled to the control terminal of the output transistor, and a second current path terminal coupled to a third supply terminal; a third transistor having a first current path terminal coupled to the control terminal of the sense transistor, a second current path terminal coupled to the second supply terminal, and a control terminal coupled to a control terminal of the second transistor and to the second current path terminal of the third transistor; and a fourth transistor having a first current path terminal coupled to the control terminal of the sense transistor, a second current path terminal coupled to the third supply terminal, and a control terminal coupled to a control terminal of the second transistor, where the control terminals of the second and fourth transistors are configured to receive a third voltage.

Example 5. The linear voltage regulator of one of examples 1 to 4, where the voltage source circuit further includes: a fifth transistor in diode configuration; a sixth transistor in diode configuration, a reference current source; and a reference resistor, where the reference resistor, the reference current source, and the fifth and sixth transistors are coupled in series, where a control terminal of the fifth transistor is coupled to the control terminals of the second and fourth transistors, and where the fifth transistor is configured to provide, at the control terminal of the fifth transistor, the third voltage.

Example 6. The linear voltage regulator of one of examples 1 to 5, where the first supply terminal is configured to receive a first supply voltage, where the second supply terminal is configured to receive a second supply voltage, where the third supply terminal is configured to receive a third supply voltage, where the third supply voltage is higher than the second supply voltage, and where the third supply voltage is higher than or equal to the first supply voltage.

Example 7. The linear voltage regulator of one of examples 1 to 5, where the first supply terminal is configured to receive a first supply voltage, where the second supply terminal is configured to receive a second supply voltage, where the third supply terminal is configured to receive a third supply voltage, where the third supply voltage is lower than the second supply voltage, and where the third supply voltage is equal to the first supply voltage.

Example 8. The linear voltage regulator of one of examples 1 to 6, where the output transistor, the sense transistor, and the second and fourth transistors are transistors of the n-type, and where the first and third transistors are transistors of the p-type.

Example 9. The linear voltage regulator of one of examples 1 to 7, where the output transistor, the sense transistor, and the second and fourth transistors are transistors of the p-type, and where the first and third transistors are transistors of the n-type.

Example 10. The linear voltage regulator of one of examples 1 to 9, where the feedback loop includes a current mirror coupled between a second current path terminal of the sense transistor and the control terminal of the output transistor.

Example ii. The linear voltage regulator of one of examples 1 to 10, where the output transistor and the sense transistor are bipolar transistors.

Example 12. The linear voltage regulator of one of examples 1 to 11, where the output transistor and the sense transistor are metal-oxide semiconductor (MOS) transistors.

Example 13. The linear voltage regulator of one of examples 1 to 12, where the first supply terminal is coupled to ground.

Example 14. The linear voltage regulator of one of examples 1 to 13, where the output transistor is configured to carry M times more current than the sense transistor, where M is a number between 10 and 50.

Example 15. A linear voltage regulator including: an output transistor having a first current path terminal configured to be coupled to a load, and a second current path terminal coupled to a first supply terminal; a sense transistor having a first current path terminal coupled to the first current path terminal of the output transistor; a current mirror coupled between a second current path terminal of the sense transistor and a control terminal of the output transistor; a filtering capacitor coupled between the control terminal of the output transistor and a second supply terminal; a first transistor having a first current path terminal coupled to the second supply terminal, and a second current path terminal coupled to the control terminal of the output transistor; a second transistor having a first current path terminal coupled to the control terminal of the output transistor, and a second current path terminal coupled to a third supply terminal; a third transistor having a first current path terminal coupled to the control terminal of the sense transistor, a second current path terminal coupled to the second supply terminal, and a control terminal coupled to a control terminal of the second transistor and to the second current path terminal of the third transistor; and a fourth transistor having a first current path terminal coupled to the control terminal of the sense transistor, a second current path terminal coupled to the third supply terminal, and a control terminal coupled to a control terminal of the second transistor.

Example 16. The linear voltage regulator of example 15, further including: a fifth transistor in diode configuration; a sixth transistor in diode configuration, a reference current source; and a reference resistor, where the reference resistor, the reference current source, and the fifth and sixth transistors are coupled in series between the second supply terminal and the third supply terminal, and where a control terminal of the fifth transistor is coupled to the control terminals of the second and fourth transistors.

Example 17. The linear voltage regulator of one of examples 15 or 16, further including an operational amplifier having a first input coupled to the first current path terminal of the output transistor, a second input configured to receive a reference voltage, and an output coupled to the control terminals of the second and fourth transistors.

Example 18. A method including: supplying, in an open loop manner, a first voltage to a control terminal of an output transistor, the output transistor having a first current path terminal coupled to a load; supplying, with the output transistor, a regulated output voltage to the load; supplying, in an open loop manner, a second voltage to a control terminal of a sense transistor, the sense transistor having a first current path terminal coupled to the load; supplying, with the output transistor and the sense transistor, a load current to the load; and applying a feedback current to the control terminal of the output transistor, the feedback current being based on a sense current flowing through the sense transistor.

Example 19. The method of example 18, where the output transistor and the sense transistor are transistors of a first type, where a first transistor has a first current path terminal coupled to the control terminal of the output transistor, the first transistor being a transistor of a second type opposite to the first type, and where at least a portion of the feedback current flows into the first current path terminal of the first transistor.

Example 20. The method of one of examples 18 or 19, where the output transistor, the sense transistor, and the first transistor are bipolar transistors, where the first current path terminal of the output transistor is an emitter terminal of the output transistor, where the first current path terminal of the sense transistor is an emitter terminal of the sense transistor, where the first current path terminal of the first transistor is an emitter terminal of the first transistor, and where during a load transient event of the load current, the portion of the feedback current flowing into the emitter terminal of the first transistor causes a change in a base-emitter voltage of the first transistor that is substantially similar to a change in a base-emitter voltage of the output transistor caused by the load current.

Example 21. The method of one of examples 18 to 20, where the load includes a plurality of logic gates coupled in a chain.

Example 22. The method of one of examples 18 to 21, further including: receiving, by a first terminal of the load, the regulated output voltage; and receiving, by a second terminal of the load, a supply voltage, where the regulated output voltage is between 0.9 V and 2.5 V above the supply voltage or between 0.9 V and 2.5 V below the supply voltage.

Example 23. A hard-disk drive (HDD) writer circuit including: a positive supply terminal configured to receive a positive supply voltage; a negative supply terminal configured to receive a negative supply voltage; an output stage configured to be coupled to a magnetic head; first and second logic chains coupled to high-side current sources of the output stage; third and fourth logic chains coupled to low-side current sources of the output stage; a first linear voltage regulator configured to provide a first regulated voltage that is lower than the positive supply voltage; and a second linear voltage regulator configured to provide a second regulated voltage that is higher than the negative supply voltage, where the first and second logic chains are configured to be powered by the positive supply voltage and the first regulated voltage, where the third and fourth logic chains are configured to be powered by the negative supply voltage and the second regulated voltage, and where first linear voltage regulator includes: an output transistor having a first current path terminal coupled to the first and second logic chains, and a second current path terminal coupled to the negative supply terminal, where the output transistor of the first linear voltage regulator is configured to provide, at the first current path terminal of the output transistor of the first linear voltage regulator, the first regulated voltage, a voltage source circuit configured to provide, in an open loop manner, a first voltage to a control terminal of the output transistor of the first linear voltage regulator, and a feedback loop coupled between the first current path terminal of the output transistor of the first linear voltage regulator and the control terminal of the output transistor of the first linear voltage regulator, the feedback loop including a sense transistor having a first current path terminal coupled to the first current path terminal of the output transistor of the first linear voltage regulator, and where second linear voltage regulator includes: an output transistor having a first current path terminal coupled to the third and fourth logic chains, and a second current path terminal coupled to the positive supply terminal, where the output transistor of the second linear voltage regulator is configured to provide, at the first current path terminal of the output transistor of the second linear voltage regulator, the second regulated voltage, a voltage source circuit configured to provide, in an open loop manner, a second voltage to a control terminal of the output transistor of the second linear voltage regulator, and a feedback loop coupled between the first current path terminal of the output transistor of the second linear voltage regulator and the control terminal of the output transistor of the second linear voltage regulator, the feedback loop including a sense transistor having a first current path terminal coupled to the first current path terminal of the output transistor of the second linear voltage regulator.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A linear voltage regulator comprising:
  an output transistor having a first current path terminal configured to be coupled to a load, and a second current path terminal coupled to a first supply terminal, wherein the output transistor is configured to provide, at the first current path terminal, a regulated output voltage;
  a voltage source circuit configured to provide, in an open loop manner, a first voltage to a control terminal of the output transistor; and
  a feedback loop coupled between the first current path terminal of the output transistor and the control terminal of the output transistor, the feedback loop comprising a sense transistor having a first current path terminal coupled to the first current path terminal of the output transistor.

2. The linear voltage regulator of claim 1, further comprising a filtering capacitor coupled between the control terminal of the output transistor and a second supply terminal.

3. The linear voltage regulator of claim 1, wherein the voltage source circuit is configured to provide, in an open loop manner, a second voltage to a control terminal of the sense transistor.

4. The linear voltage regulator of claim 3, wherein the voltage source circuit comprises:
  a first transistor having a first current path terminal coupled to a second supply terminal, and a second current path terminal coupled to the control terminal of the output transistor;
  a second transistor having a first current path terminal coupled to the control terminal of the output transistor, and a second current path terminal coupled to a third supply terminal;
  a third transistor having a first current path terminal coupled to the control terminal of the sense transistor, a second current path terminal coupled to the second supply terminal, and a control terminal coupled to a control terminal of the second transistor and to the second current path terminal of the third transistor; and
  a fourth transistor having a first current path terminal coupled to the control terminal of the sense transistor, a second current path terminal coupled to the third supply terminal, and a control terminal coupled to a control terminal of the second transistor, wherein the control terminals of the second and fourth transistors are configured to receive a third voltage.

5. The linear voltage regulator of claim 4, wherein the voltage source circuit further comprises:
  a fifth transistor in diode configuration;
  a sixth transistor in diode configuration;
  a reference current source; and
  a reference resistor, wherein the reference resistor, the reference current source, and the fifth and sixth transistors are coupled in series, wherein a control terminal of the fifth transistor is coupled to the control terminals of the second and fourth transistors, and wherein the fifth transistor is configured to provide, at the control terminal of the fifth transistor, the third voltage.

6. The linear voltage regulator of claim 4, wherein the first supply terminal is configured to receive a first supply voltage, wherein the second supply terminal is configured to receive a second supply voltage, wherein the third supply terminal is configured to receive a third supply voltage, wherein the third supply voltage is higher than the second supply voltage, and wherein the third supply voltage is higher than or equal to the first supply voltage.

7. The linear voltage regulator of claim 4, wherein the first supply terminal is configured to receive a first supply voltage, wherein the second supply terminal is configured to receive a second supply voltage, wherein the third supply terminal is configured to receive a third supply voltage, wherein the third supply voltage is lower than the second supply voltage, and wherein the third supply voltage is equal to the first supply voltage.

8. The linear voltage regulator of claim 4, wherein the output transistor, the sense transistor, and the second and fourth transistors are transistors of the n-type, and wherein the first and third transistors are transistors of the p-type.

9. The linear voltage regulator of claim 4, wherein the output transistor, the sense transistor, and the second and fourth transistors are transistors of the p-type, and wherein the first and third transistors are transistors of the n-type.

10. The linear voltage regulator of claim 1, wherein the feedback loop comprises a current mirror coupled between a second current path terminal of the sense transistor and the control terminal of the output transistor.

11. The linear voltage regulator of claim 1, wherein the output transistor and the sense transistor are bipolar transistors.

12. The linear voltage regulator of claim 1, wherein the output transistor and the sense transistor are metal-oxide semiconductor (MOS) transistors.

13. The linear voltage regulator of claim 1, wherein the first supply terminal is coupled to ground.

14. The linear voltage regulator of claim 1, wherein the output transistor is configured to carry M times more current than the sense transistor, wherein M is a number between 10 and 50.

15. A linear voltage regulator comprising:
an output transistor having a first current path terminal configured to be coupled to a load, and a second current path terminal coupled to a first supply terminal;
a sense transistor having a first current path terminal coupled to the first current path terminal of the output transistor;
a current mirror coupled between a second current path terminal of the sense transistor and a control terminal of the output transistor;
a filtering capacitor coupled between the control terminal of the output transistor and a second supply terminal;
a first transistor having a first current path terminal coupled to the second supply terminal, and a second current path terminal coupled to the control terminal of the output transistor;
a second transistor having a first current path terminal coupled to the control terminal of the output transistor, and a second current path terminal coupled to a third supply terminal;
a third transistor having a first current path terminal coupled to the control terminal of the sense transistor, a second current path terminal coupled to the second supply terminal, and a control terminal coupled to a control terminal of the second transistor and to the second current path terminal of the third transistor; and
a fourth transistor having a first current path terminal coupled to the control terminal of the sense transistor, a second current path terminal coupled to the third supply terminal, and a control terminal coupled to a control terminal of the second transistor.

16. The linear voltage regulator of claim 15, further comprising:
a fifth transistor in diode configuration;
a sixth transistor in diode configuration,
a reference current source; and
a reference resistor, wherein the reference resistor, the reference current source, and the fifth and sixth transistors are coupled in series between the second supply terminal and the third supply terminal, and wherein a control terminal of the fifth transistor is coupled to the control terminals of the second and fourth transistors.

17. The linear voltage regulator of claim 15, further comprising an operational amplifier having a first input coupled to the first current path terminal of the output transistor, a second input configured to receive a reference voltage, and an output coupled to the control terminals of the second and fourth transistors.

18. A method comprising:
supplying, in an open loop manner, a first voltage to a control terminal of an output transistor, the output transistor having a first current path terminal coupled to a load;
supplying, with the output transistor, a regulated output voltage to the load;
supplying, in an open loop manner, a second voltage to a control terminal of a sense transistor, the sense transistor having a first current path terminal coupled to the load;
supplying, with the output transistor and the sense transistor, a load current to the load; and
applying a feedback current to the control terminal of the output transistor, the feedback current being based on a sense current flowing through the sense transistor.

19. The method of claim 18, wherein the output transistor and the sense transistor are transistors of a first type, wherein a first transistor has a first current path terminal coupled to the control terminal of the output transistor, the first transistor being a transistor of a second type opposite to the first type, and wherein at least a portion of the feedback current flows into the first current path terminal of the first transistor.

20. The method of claim 19, wherein the output transistor, the sense transistor, and the first transistor are bipolar transistors, wherein the first current path terminal of the output transistor is an emitter terminal of the output transistor, wherein the first current path terminal of the sense transistor is an emitter terminal of the sense transistor, wherein the first current path terminal of the first transistor is an emitter terminal of the first transistor, and wherein during a load transient event of the load current, the portion of the feedback current flowing into the emitter terminal of the first transistor causes a change in a base-emitter voltage of the first transistor that is substantially similar to a change in a base-emitter voltage of the output transistor caused by the load current.

21. The method of claim 18, wherein the load comprises a plurality of logic gates coupled in a chain.

22. The method of claim 18, further comprising:
receiving, by a first terminal of the load, the regulated output voltage; and
receiving, by a second terminal of the load, a supply voltage, wherein the regulated output voltage is between 0.9 V and 2.5 V above the supply voltage or between 0.9 V and 2.5 V below the supply voltage.

* * * * *